United States Patent [19]

Hoste

[11] Patent Number: 5,327,349
[45] Date of Patent: Jul. 5, 1994

[54] METHOD AND APPARATUS FOR ANALYZING AND RECORDING DOWNTIME OF A MANUFACTURING PROCESS

[75] Inventor: Stephen A. Hoste, Royal Oak, Mich.

[73] Assignee: Square D Company, Palatine, Ill.

[21] Appl. No.: 48,155

[22] Filed: Apr. 15, 1993

[51] Int. Cl.$^5$ .............................................. G06F 15/46
[52] U.S. Cl. .................................... 364/468; 364/184
[58] Field of Search ........... 364/468, 474.11, 184–187, 364/478, 401–403, 153, 156; 377/16; 324/537

[56] References Cited

U.S. PATENT DOCUMENTS

| | | | |
|---|---|---|---|
| 3,604,904 | 10/1971 | Stiebel et al. | 377/16 |
| 3,670,147 | 6/1972 | Wright | 377/16 |
| 4,200,930 | 4/1980 | Rawlings et al. | 395/200 |
| 4,310,844 | 1/1982 | Imamoto | 346/1.1 |
| 4,533,865 | 8/1985 | Schlenk | 324/537 |
| 4,870,592 | 9/1989 | Lampiet et al. | 364/468 |
| 4,872,485 | 10/1989 | Laverty, Jr. | 137/624.11 |
| 5,195,041 | 3/1993 | George et al. | 364/468 |
| 5,280,425 | 1/1994 | Hogge | 364/468 |

Primary Examiner—Jerry Smith
Assistant Examiner—Cameron H. Tousi
Attorney, Agent, or Firm—Michael J. Femal; Richard J. Graefe; Larry I. Golden

[57] ABSTRACT

A method and apparatus records downtime and the probable cause of the downtime of a network of programmable logic controllers and other microprocessor based devices for controlling of a manufacturing process. The method and apparatus also records the total downtime by separate causes and a total downtime of all causes encountered. The apparatus further records the number of times each cause occurred and a total number of all causes encountered. A graphical display provides a visual presentation of the number of times each cause occurred and the total downtime for each cause that occurred in Pareto chart form. The method provides for prioritizing alarms associated with the cause of a downtime and the apparatus has means for deciding which alarm notification, based on the alarm priority and therefore, its corresponding cause, recorded the most number of times it caused a downtime.

11 Claims, 5 Drawing Sheets

METHOD AND APPARATUS FOR ANALYZING AND RECORDING DOWNTIME OF A MANUFACTURING PROCESS

TECHNICAL FIELD

Applicant's invention relates generally to programmable logic controllers (PLCs) that direct the automatic operation of a manufacturing process, and more particularly to a system and method of recording downtime of the process and the causes for the downtime.

BACKGROUND ART

PLCs have been linked together in communication networks to coordinate the operation of an entire manufacturing or process plant, or in other instances, to control the operation of cells or segments of the operation. A cell controller typically coordinates and manages the operation of the cell, which consists of the PLCs and other programmable machine controls, and is designed to perform a complete manufacturing or process related task. The PLCs transfer messages between themselves and possibly to a host computer that provides supervisory control or monitoring of the process. These messages usually contain status information indicating the condition of the various interlocks, sensors, and other controls that monitor and control the process.

Many methods have been utilized to increase quality and improve productivity in the manufacturing environment. One such method is the use of a special form of a bar graph known as a Pareto Chart. The chart, developed by Dr. Joseph M. Juran, is based upon the Pareto principle which states that 80 percent of the problems come from 20 percent of the causes. The bars of the chart are arranged in descending order by height, with the height representing the frequency or relative importance of the cause. The Pareto Chart provides a graphic illustration of the categorical causes and is useful for establishing priorities, for showing which causes contribute most of the problems, and for showing the most significant opportunities for improvement which will yield the greatest return if rectified. Different measurement scales on the charts can help identify the more important causes. In most cases, frequency of the cause may be the most important. However, if one particular cause results in a long downtime of the process, downtime may provide a more useful parameter to display.

Present manufacturing processes require an operator to manually enter into a log, the cause and the length of the downtime. Further calculations are required to compute probability of the cause of the downtime if multiple causes are possible and to generate the chart itself. These calculations are difficult to do on-line and in real-time since they require operator intervention.

SUMMARY OF THE INVENTION

Accordingly, the principal object of the present invention is to provide a method and apparatus for recording downtime and the probable cause of the downtime of a manufacturing process.

A further objective of the invention is to provide a method and apparatus for recording the total downtime by cause of a manufacturing process and a total of all downtimes encountered.

Yet a further objective of the invention is to provide a method and apparatus for recording the number of times each cause occurred and a total number of all causes encountered.

Another objective of the invention is to provide a method and apparatus for graphically displaying the number of times each cause occurred, the total number of all causes encountered, the total downtime for each cause that occurred and the total downtime of all causes encountered.

In addition, another objective of the invention is to provide a method for prioritizing a received alarm associated with the cause of a downtime. and apparatus for deciding which alarm notification and therefore its corresponding cause recording the number of times each cause occurred and a total number of all causes encountered.

In one embodiment of the invention, an alarm handler receives a notification from the network that a downtime event has started. Since a downtime could have been caused by several faults, failures in the form of alarms are recorded during a short time interval at the beginning of the downtime. Each alarm is predetermined to have a probability factor and the alarm handler will select the alarm with the highest factor as the probable cause of the downtime at the end of the short time interval. This is based on the assumption that the actual fault that causes the event should occur within a short time of the actual shutdown. Any other alarms received after this interval will be ignored. The handler will then record the total length of time for the downtime event. After the event is over, the alarm handler will update two registers associated with the selected alarm. One will contain the total number of times that alarm caused the downtime and the other will accumulate the total downtime associated with that alarm. The alarm handler maintains two alarm summary data tables. One will store an alarm number for each of the faults that caused the most total downtime and the other will store the alarm that caused the highest number of separate downtimes. During downtime these tables are scanned and updated such that the alarms are sorted in descending order to give an indication of the most costly alarms on the basis of number of times that they occurred and the total downtime.

The data in these summary tables are stored in addressable registers that can be read by a line supervisory device or an upper level plant host computer. A graphics package can also access these registers and provide a visual display utilizing bar graphs to provide the Pareto charts from the data.

Other features and advantages of the invention will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
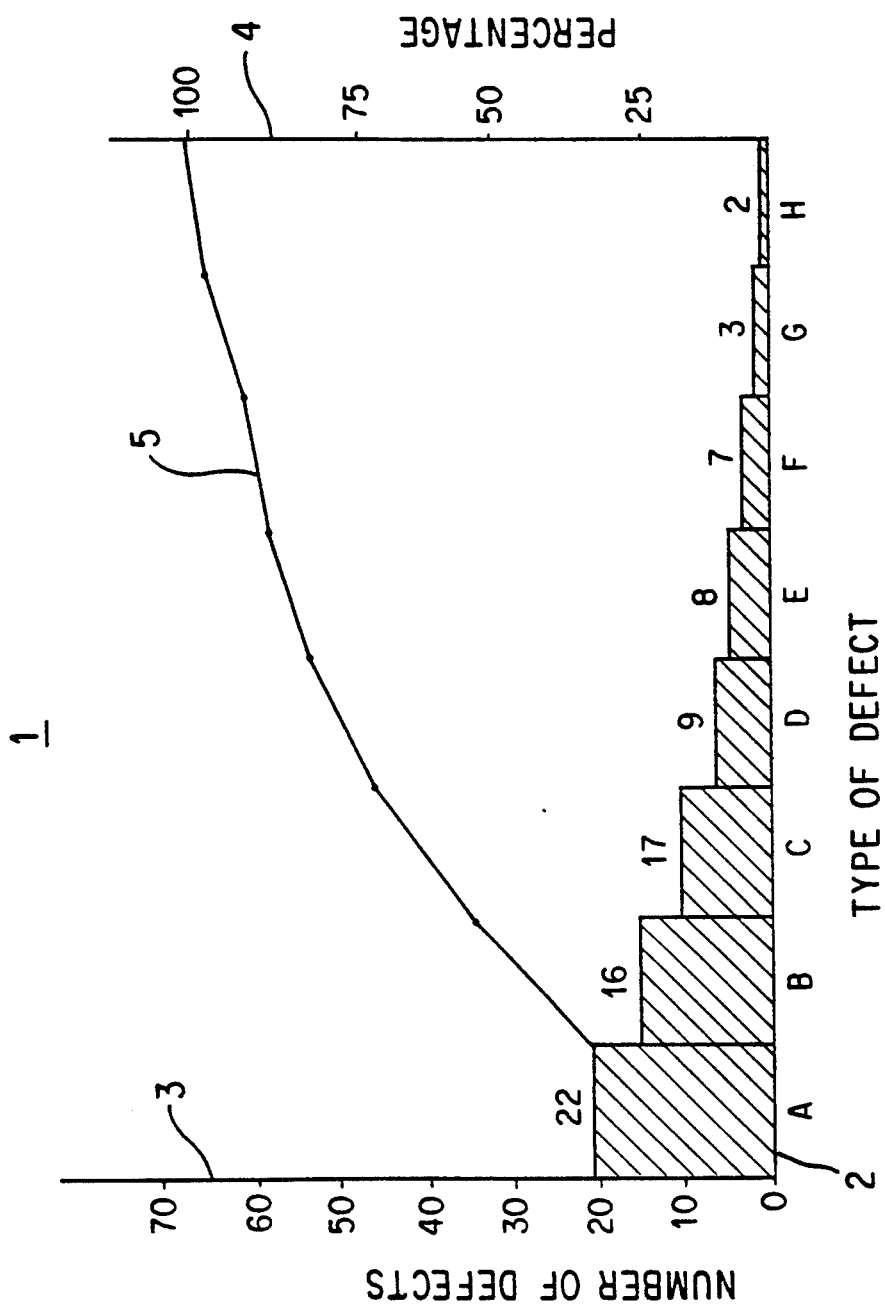
FIG. 1 is a diagram of a typical Pareto chart.

FIG. 1 illustrates a typical Pareto Chart 1 of the type that could be generated by the apparatus of the present invention. Different defects A-H of a manufacturing process are plotted along a horizontal axis 2, in descending order of the number of times a defect occurred. A left vertical axis 3 is scaled in equal x unit increments to represent the number of defects. A right vertical axis 4 represents the total percentage of defects, scaled from 0 to 100 percent. Thus for defect A, which occurred 22 times, the bar graph indicates a height of 22 and a percentage of 32. Defect B is plotted next to a with 16 occurrences. The percentage of its occurrences is added to A to produce the cumulative line 5, which will equal 100 percent when all defects are added. The rest of the defects are plotted in a similar manner. The result will be an accurate represenatation of the defects of the manufacturing process and provide a means for addressing those defects which, when corrected, will provide the greatest return.

Figure 2:
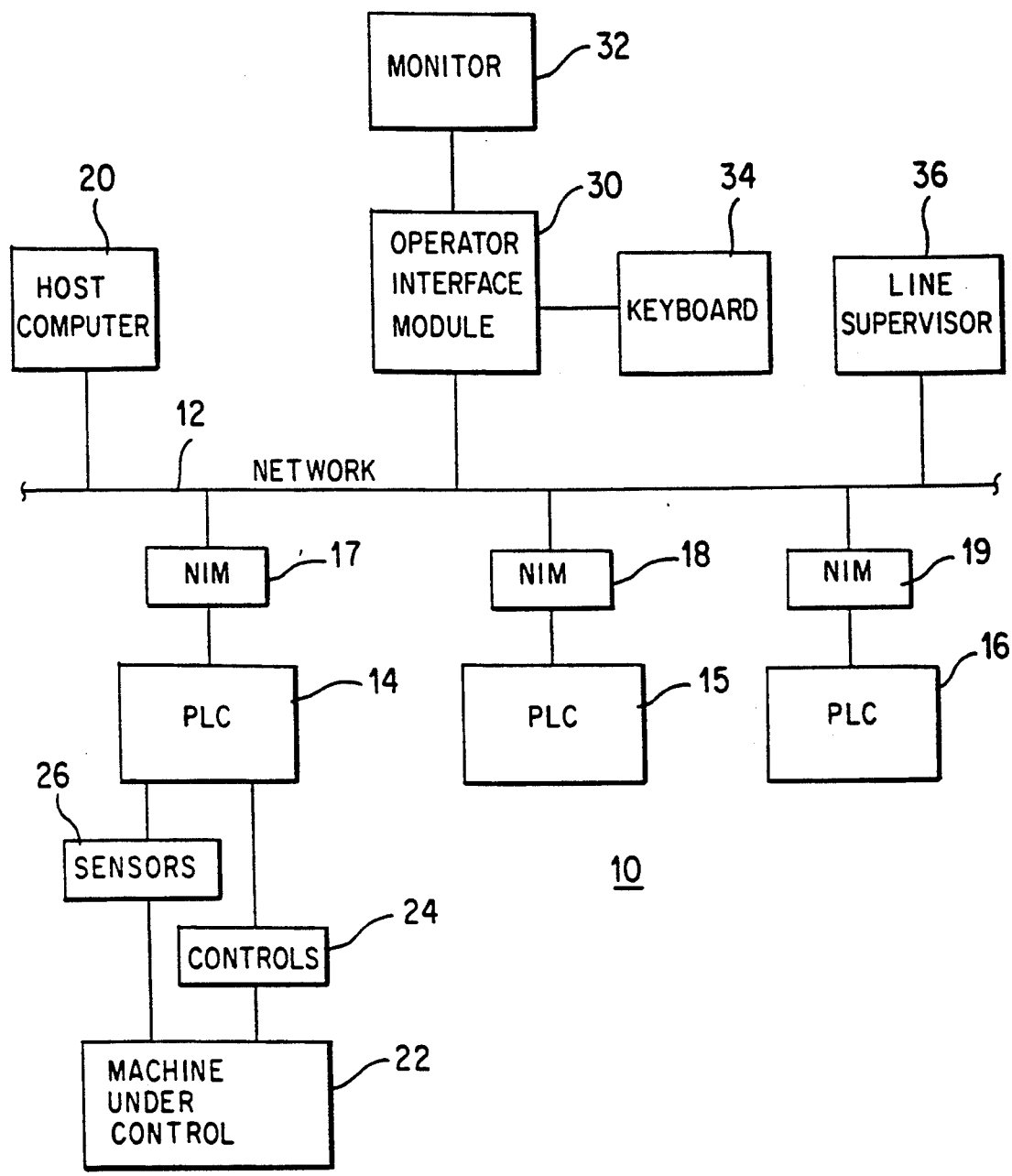
FIG. 2 is a schematic block diagram of a system for monitoring and analyzing downtime of a manufacturing process according to the present invention.

Referring to FIG. 2, a plant network 10 for monitoring and analyzing downtime of a manufacturing process according to the present invention is disclosed. A communications network 12 interconnects a series of programmable logic controllers (PLCs) through network interface modules 17-19 respectively. The PLCs operate together as a manufacturing cell to monitor and control machine tools, presses, or other types of machines or processes. A host computer 20 provides further control and monitoring functions. Details of the communications network, the interconnectivity between the components connected thereto, and the method of message interchanges between the devices, although not a part of the invention, are disclosed in commonly assigned U.S. Pat. No. 5,159,673, "Apparatus For Networking Programmable Logic Controllers To Host Computers," issued Oct. 27, 1992, the details of which are incorporated herein. However, Applicant's invention is not restricted to this type of networking. PLC 14 controls the operation of machine 22 through controls 24 and receives status information through sensors 24. These controls 24 could be contactors, switches, safety interlocks and so on.

One of the functions of an operator interface module 30 is to provide a means for monitoring the operation of the overall cell. Monitor 32 can provide a visual or graphic presentation of the various operating parameters or conditions of the machines under control. Keyboard 34 allows selection of the data that is to be displayed. It can also be used to make programming changes to the operating programs in PLCs 14-16. Line supervisor 36 can perform similar functions. The operator interface module 30 can also be utilized as a cell controller for the networked PLCs 14-16.

Figure 3:
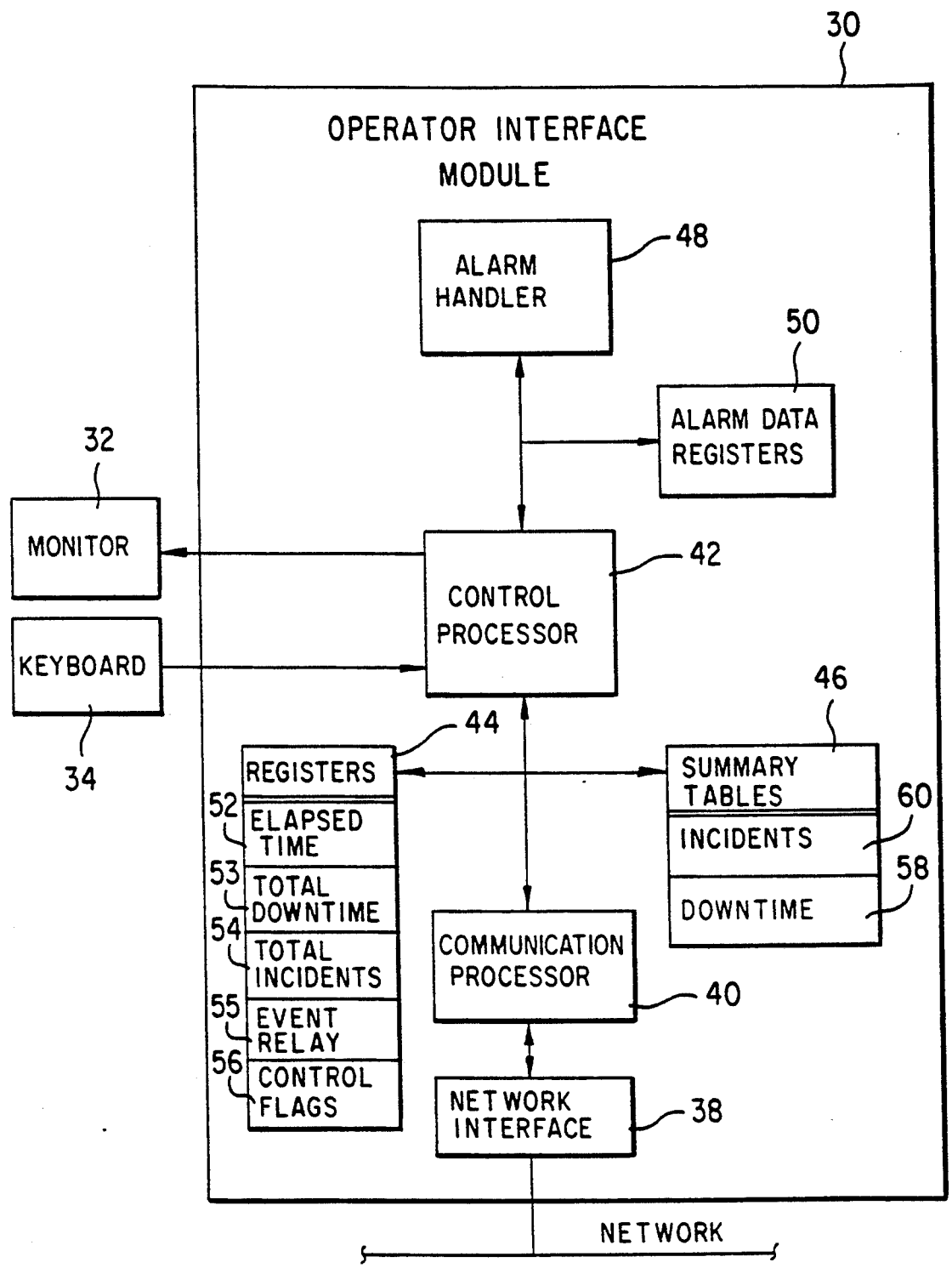
FIG. 3 is a detailed schematic block diagram of an operator interface as depicted in FIG. 2.

In the preferred embodiment, the operator interface module 30 provides a method of monitoring and analyzing downtime of a manufacturing cell and is illustrated in FIG. 3. A network interface 38 provides the connectivity to the network 12 and is controlled by a communications processor 40 for controlling the interchange of messages with the network 12 and a control processor 42 within the operator interface module 30. The control processor 42 contains the operating program for monitoring and analyzing the downtime of the cell under control. A downtime event can be caused by an open interlock or the initiation of a mode of operation change without the proper interlocks closed or events occurring in a prescribed sequence. When this happens, the operating program in the particular PLC 14-16 will send an alarm over the communication network 12 to the operator interface module 30.

Data registers 44 and data summary tables 46 are accessible by both the control processor 42 and the communications processor 40. An alarm handler 48 is used for receiving multiple alarms from devices on the network 12 and determining which of the alarms was the probable cause of a downtime. Alarm data register 50 are used for storing information concerning each alarm. This information can be entered manually through keyboard 34 and will be described later. Among the data registers 44 are registers for recording elapsed time 52, total downtime 53, and total incidents 54. An event relay 55 and other control flags 56 are also contained in these registers 44. Included in the summary tables 46 are registers for storing downtime 58 and incidents 60. Information stored in these table is used for generating Pareto charts. Both registers 44 and summary tables 46 are readable by other devices on the network 12. Therefore the summary tables could be read directly by the host computer 20 and the line supervisor 36, and programs within those devices could use the data in the tables to also generate separate charts.

The control flags 56 are used to indicate the process status. When an alarm is received from the network 12, a control flag is set to indicate the start of the downtime event. Another flag indicates the end of the downtime event. For processes containing multiple cells to control a production line, these flags provide a means of alerting other cells that a downtime event is in process and will prevent other cells from recording accumulated downtimes at the same time. This is generally required when total actual downtime of a production line must equal the sum of the downtime from the individual cells. Only one cell generally is the cause of the downtime and only that one will record the downtime, even though other cells may malfunction as a result of the downtime of the cell that caused the original downtime event.

Figure 4:
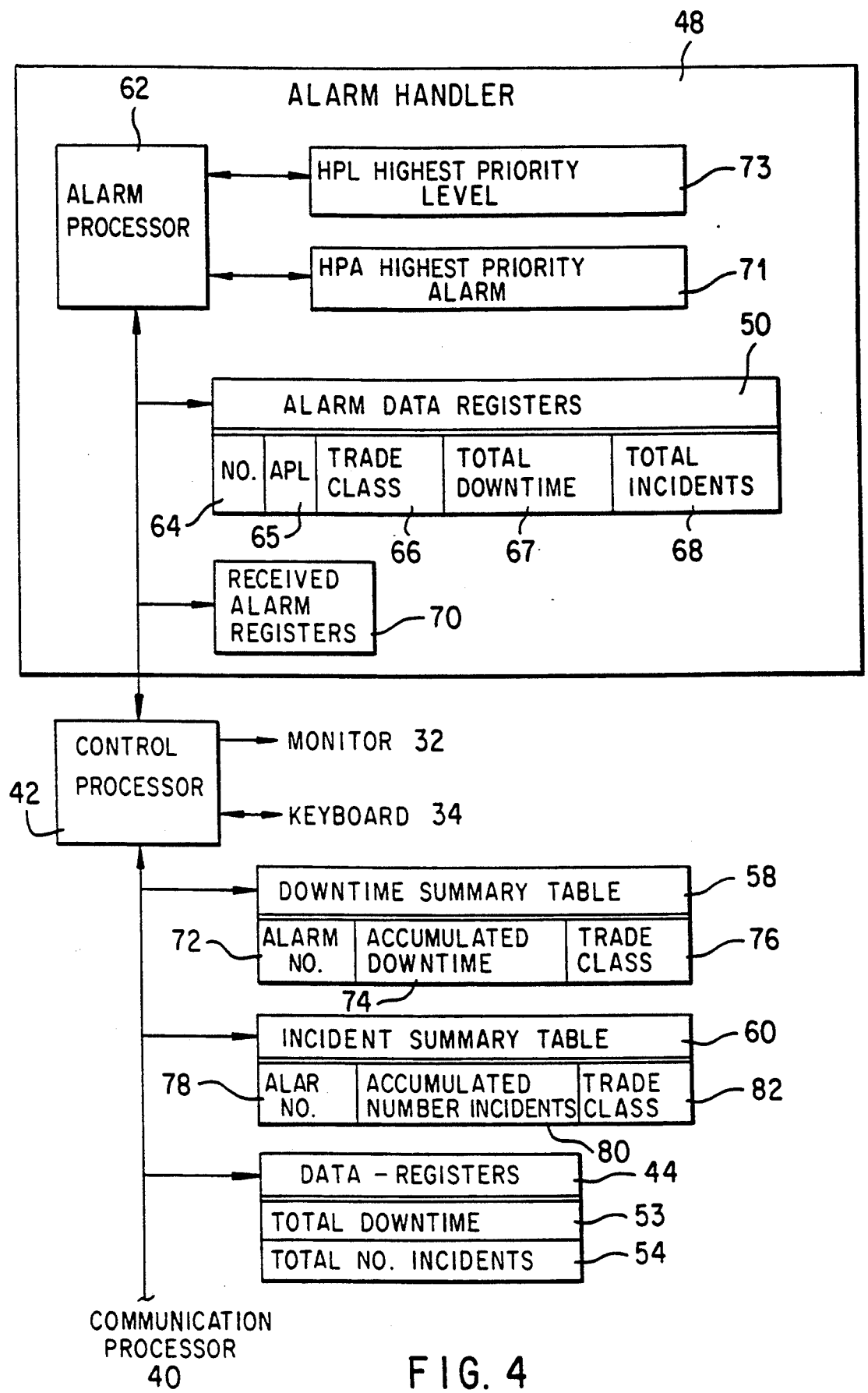
FIG. 4 is a detailed schematic block diagram of an alarm handler as depicted in FIG. 3.

Referring to FIG. 4, the alarm handler 48 is further detailed. An alarm processor 62 controls the flow of alarm messages within the operator interface module 30. The alarm data registers 50 contain a separate data stream for each of the possible alarms from the devices on the network 12. This data consists of an alarm number in the range of 1 through 99, an alarm priority level (APL) constant 65 in the range of 0 through 3, and a trade class 66 which lists the most likely resource or trade group which will be required to correct the fault that caused the alarm. This data is normally entered by an operator through the keyboard 34. The APL constant 65 is meant to assign a probability factor to the designated alarm, with those alarms having a high likelihood of causing a downtime are assigned a value of 0 and those alarms having a very low likelihood of causing a downtime are assigned a value of 3. Also associated with each alarm is a downtime register 67 for accumulating the total downtime that that alarm was the cause of the downtime, and an incident register 68 for accumulating the total number of times that that alarm was the cause of a downtime. Since a downtime could have several faults or causes, a received alarm register 70 stores alarms as they are received and the alarm processor 62 will select the alarm from that register which was the most probable cause of the downtime. The selected alarm number will be stored in a highest priority alarm (HPA) 71 register and the corresponding APL 65 of the alarm will be stored in a highest priority level (HPL) 73 register.

During a downtime incident, the control processor 42 will add the elapsed time 52 to the total downtime register 53. The total incident register 54 will be incremented by one. The control processor 42 will update the summary tables 46 with the new data resulting from the downtime. The downtime summary table 58 contains data for a predetermined number of alarms that consists of an alarm number 72, total accumulated downtime 74 for that alarm, and trade class 76 for that alarm. A sorting routine will sort the table in descending order according to accumulated downtime 74. The incident summary table 60 also contains data for a predetermined number of alarms that consists of an alarm number 78, total number of incidents 80 accumulated for that alarm, and trade class 82 for that alarm. A sorting routine will sort the table in descending order according to the accumulated incidents 80. Information in these tables 58, 60 are in form for easy implementation into a Pareto chart as shown in FIG. 1. A graphics program, not an object of the present invention and well known to those skilled in the art, operating in the control processor 42 can obtain the data from the tables 58, 60 and provide a visual display of the chart on the monitor 32. Likewise, the host computer 20 or the line supervisor 36 can directly address the summary tables 58, 60 to obtain the data to provide a remote display of the Pareto chart.

Figure 5:
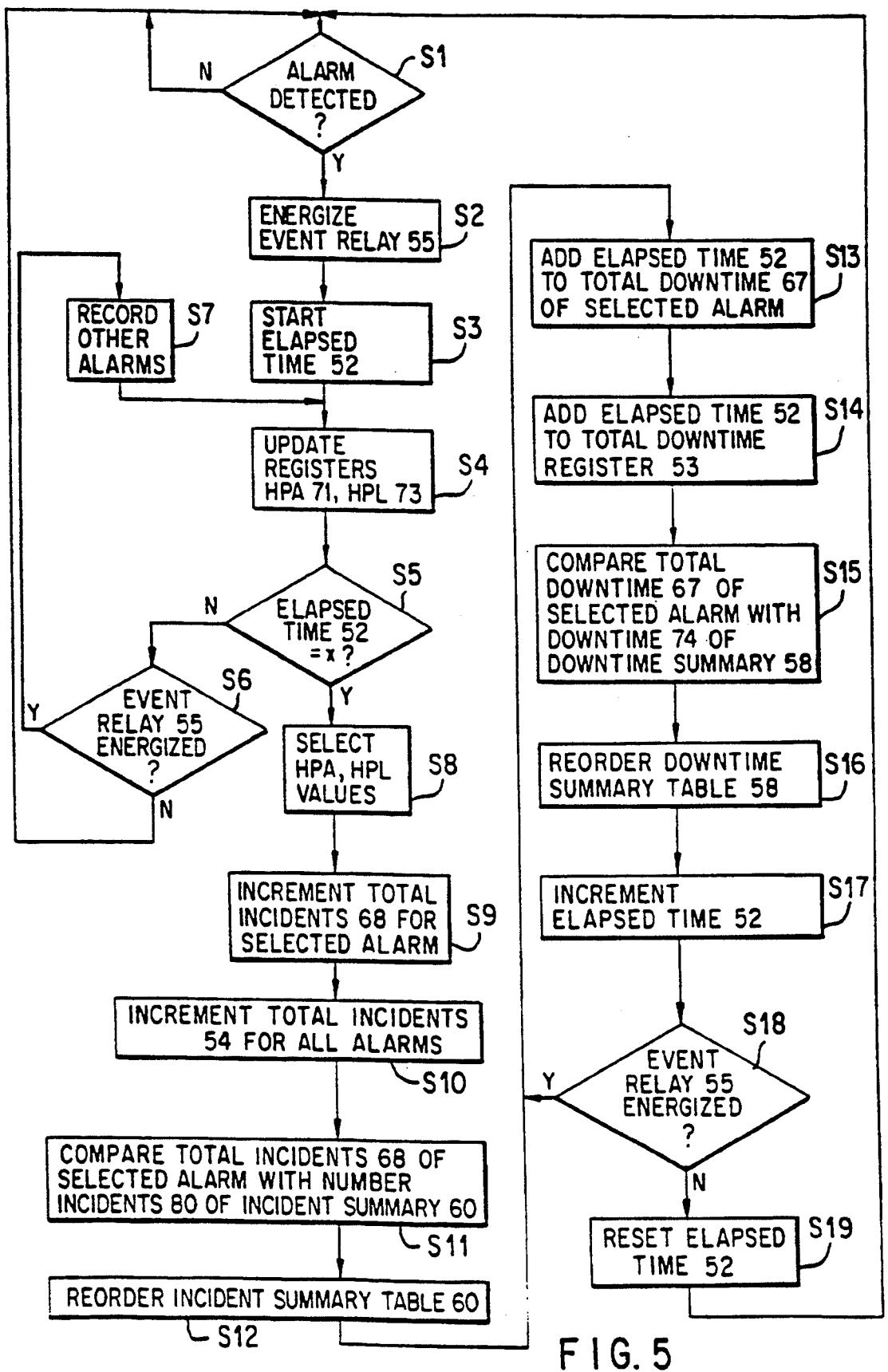
FIG. 5 is a flow chart for detailing the operation of the system disclosed in FIG. 2.

The flow chart in FIG. 5 provides a more detailed description of the preferred embodiment of the present invention. Logic in the PLCs 14-16 determines when the process is not operating in a correct mode and a downtime has started. The affected PLC will send an alarm over network 12 addressed to the operator interface module 30 which monitors the network 12 at step S1 for any alarm. If an alarm that caused a downtime is detected, the event relay 55 is energized at step S2. As long as this relay is energized, the elapsed timer 52 at step S3 is also enabled. An enable flag 56 is reset which allows HPA 71 and HPL 73 registers to be updated by the received alarms at step S4. The alarm processor 62 will receive the alarms and store them in the received alarm registers 70 in the order that they are received. The first received alarm and its associated alarm data register 50 will be examined for the APL 65 and alarm number 64 associated with the alarm. The APL 65 and the alarm number 64 will be entered into the HPA 71 and HPL 73 registers respectively. Since a downtime can be annunciated by several different alarms at the same time and under the premise that most alarms will occur at the very beginning of the event, the alarms need only be monitored for a short predetermined period of time X that is settable. Thus, at step S5, the elapsed time is compared with X. If it is less than X, step 6 will make sure that an event is still in process by monitoring the event relay 55. A minimum time must elapse before an occurrence is considered a downtime event. If the event relay 55 deenergizes before time X is reached, the system will reset and wait for the next occurrence.

If it has not, step 7 will examine the next received alarm. Its APL 65 will be compared with the APL stored in the HPL register. If it is greater, the HPA 71 and HPL 73 registers will be updated by the APL 65 and number 64 of the newly selected alarm at step S4. If it is not, and if the elapsed time is still less than X, these steps, S4–S7, will be repeated until the elapsed time equals X. Step S8 then will then identify the alarm that had the highest APL 65 and therefore the highest probability of being the cause of the downtime.

Once an alarm number has been selected, its total incident counter 68 will be incremented by one at step S9 and the total incident for all alarms register 54 in the data registers 44 will also be incremented by one at step S10.

The incident summary table 60 that becomes the basis for a Pareto chart as shown in FIG. 1 is upgraded in steps S11-12, resulting in a table listing the alarms in descending order according to the number of downtime occurrences. The total incidents register 68 of the selected alarm data register 50 is compared with the accumulated number of incidents 80 registers for the alarms stored in the downtime summary table 58 from previous downtime events which have been sorted in the table in descending order according to the accumulated number of incidents 80. If the total downtime incidents 68 for the selected alarm exceeds any entries in the summary table 60, all lesser valued entries will be shifted down one position and the selected alarm will be inserted into the summary above them. If an entry already exists for the selected alarm, its old location in the summary table will be replaced by other entries that had lessor values. Thus the summary table 60 will be representative of the alarms that have the greatest number of downtime incidents, sorted in descending order.

The event elapsed time register 52 will continue to be incremented at step S13 until the event relay 55 deenergizes, signaling the end of the downtime event. At step S14 the event elapsed time 53 will be added to the accumulated total downtime register 67 of the selected alarm data register 50. Likewise, the event elapsed time 53 will be added to the total accumulated downtime register 53 for all alarms in global registers 44 at step S15.

The downtime summary table 58 that becomes the basis for a Pareto chart as shown in FIG. 1 is updated in steps S16–S17. The total downtime register 67 of the selected alarm data register 50 is compared with the accumulated downtime 74 registers for the alarms stored in the downtime summary table 58 from previous downtime events which have been sorted in the table in descending order according to the accumulated downtime 74. If this total downtime 67 for the selected alarm exceeds any entries in the summary table 58, all lesser valued entries will be shifted down one position and the selected alarm will be inserted into the summary above them. If an entry already exists for the selected alarm, its old location in the summary table will be replaced by other entries that had lessor values. Thus, the summary table 58 will be representative of the alarms that have the greatest amount of accumulated downtime, sorted in descending order.

The event relay 55 will be checked at step C18 to see if it is still energized. If it still is, steps 14-17 will be repeated to continue updating the elapsed time register 52 and the downtime register 67. If the event relay 55 is deenergized, indicating the end of the downtime event, the elapsed time register 52 is reset and the system returns to a monitoring status, waiting for the next downtime event to occur, starting the process over again.

Both summary tables 58 and 60 are directly readable by the other devices on the network 12, including the host computer 20 and the line supervisor 36, and programs within those devices could use the data in the tables to generate separate charts. To provide greater flexibility, separate memory locations can be used to store data from these tables dependant on other variables such as the mode of operation, the work shift, or a particular process. For instance, a typical application might control a multiple stamping press line. The modes of operation could include production by tandem press (REMOTE), or transfer (CONTINUOUS), and automatic die change (ADC). Separate alarm summary data tables 58, 60 could be maintained for downtimes incurred during production or during an ADC. These tables can then provide a short term method for retrieving downtime history from past production runs and different die changes which will allow an operator to recall and display this data for the last time a particular process was run.

The number of different alarms that can be accommodated by the alarm handler 48 in the preferred embodiment of the present invention is set at 99 by design choice. The Pareto routine, for convenience, is limited to displaying up to 24 different alarms at a time. Since the more frequent alarms are of particular interest, only the top 8 entries of the separate alarm summary data tables 58, 60 need to be saved when making process, shift or die changes.

While the specific embodiments have been illustrated and described, numerous modifications are possible without departing from the scope or spirit of the invention.

I claim:

1. An operator interface module connected to a network of programmable logic controllers and other microprocessor based devices controlling a manufacturing process, said operator interface module for analyzing and recording downtime of said manufacturing process, and said operator interface module comprising:
   a. a network interface module for connecting to said network;
   b. a control processor;
   c. a communications processor connected between said network interface module and said control processor, said communications processor for controlling communications between said operator interface module and said network of programmable logic controllers and other microprocessor based devices;
   d. memory means accessible by said communications processor and said control processor;
   e. an alarm handler connected to said control processor, said alarm handler for receiving a plurality of alarms from said network indicative of a downtime event of said manufacturing process, for determining which of said plurality of alarms caused said downtime event, and for determining an elapsed time of said downtime event;
   f. alarm data registers accessible by said alarm handler and said control processor, said alarm data registers for storing data by said alarm handler related to said downtime event for each of said plurality of received alarms;
   g. display means connected to said control processor;
   h. keyboard entry means connected to said control processor;
   i. wherein said control processor accesses said data stored in said alarm data registers and provides first and second data summary tables in said memory means, said first summary table for storing data based on total number of downtime incidents for each of said plurality of alarms and said second summary table for storing data based on total elapsed time of downtime incidents for each of said plurality of alarms; and
   j. wherein said first and second summary tables are directly accessible by said network of programmable logic controllers and other microprocessor based devices.

2. The operator interface module of claim 1 wherein said memory means further includes a register for storing the total number of all downtime incidents from all alarms.

3. The operator interface module of claim 1 wherein said memory means further includes a register for storing the total elapsed time of all downtime incidents from all alarms.

4. The operator interface module of claim 1 wherein said data stored in said alarm data registers consists of an alarm number, an alarm priority level, a trade classification, a total accumulated downtime, and a total number of downtime incidents for each of said plurality of received alarms.

5. The operator interface module of claim 4 wherein said alarm priority level is for determining by said alarm handler which of said plurality of alarms caused said downtime event.

6. The operator interface module of claim 4 wherein said alarm priority level is determined by an operator of said manufacturing process and manually entered by said keyboard entry means.

7. The operator interface module of claim 4 wherein data in said first summary table includes an alarm number and the total accumulated downtime and trade classification associated with said alarm number, and wherein said control processor collects said data from said alarm data registers and sorts said data for a predetermined number of alarms in descending order, based on said total accumulated downtime.

8. The operator interface module of claim 7 wherein said display means connected to said control processor provides a visual presentation of said first summary table based on said alarm number and said total accumulated downtime.

9. The operator interface module of claim 4 wherein data in said second summary table includes an alarm number and the total number of downtime incidents and trade classification associated with said alarm number, and wherein said control processor collects said data from said alarm data registers and sorts said data for a predetermined number of alarms in descending order, based on said total number of downtime incidents.

10. The operator interface module of claim 9 wherein said display means connected to said control processor provides a visual presentation of said second summary table based on said alarm number and said total number of downtime incidents.

11. A method for analyzing downtime of a network of programmable logic controllers and other microprocessor based devices controlling a manufacturing process, said method operating in an operator interface module and comprising:

a. setting an alarm priority level for each of a plurality of alarms signals;
b. receiving a plurality of alarms from said network of programmable logic controllers and other microprocessor based devices indicating a start of a downtime event;
c. starting an elapsed timer for recording total length of time of said downtime event;
d. selecting one of said plurality of received alarms as a cause of said downtime event based on said alarm priority level of each of said received alarms;
e. incrementing by one, one of a plurality of incident counters, said one incident counter assigned to said selected alarm, and said increment counter for recording total number of times said alarm caused said downtime incident;
f. adding total length of time of said downtime event to one of a plurality of elapsed downtime registers, said one elapsed downtime register assigned to said selected alarm, and said elapsed downtime register for recording total elapsed downtime said alarm caused said downtime incident;
g. generating a downtime incident summary table from said plurality of incident counters, said summary table listing a predetermined number of said alarms and identifying said alarm by an alarm number, said generation of said downtime summary table further including sorting said alarms in descending order based on said total number of times said alarm caused downtime incidents;
h. generating a downtime summary table from said plurality of elapsed downtime registers, said summary table listing a predetermined number of said alarms and identifying said alarm by an alarm number, said generation of said downtime summary table further including sorting said alarms in descending order based on said total elapsed downtime when said alarm caused downtime incidents;
i. displaying a portion of said downtime incident summary table in bar chart form, said display indicating said alarm number and its respective total number of downtime incidents, said display in descending order based on said downtime incidents; and
j. displaying a portion of said downtime summary table in bar chart form, said display indicating said alarm number and its respective total elapsed downtime, said display in descending order based on said total elapsed downtime.

* * * * *